US008917492B2

(12) United States Patent
Guerin et al.

(10) Patent No.: US 8,917,492 B2
(45) Date of Patent: Dec. 23, 2014

(54) POWER STORAGE MODULE FOR MICRO-HYBRID SYSTEM OF MOTOR VEHICLE

(75) Inventors: Fabien Guerin, Chatillon (FR); Roger Abadia, Neuilly-Plaisance (FR); Benoît Soucaze-Guillous, Bondy (FR); Alexis Hosni, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 215 days.

(21) Appl. No.: 13/393,595

(22) PCT Filed: Sep. 7, 2010

(86) PCT No.: PCT/FR2010/051861
§ 371 (c)(1),
(2), (4) Date: Jun. 14, 2012

(87) PCT Pub. No.: WO2011/033209
PCT Pub. Date: Mar. 24, 2011

(65) Prior Publication Data
US 2012/0250224 A1  Oct. 4, 2012

(30) Foreign Application Priority Data
Sep. 15, 2009 (FR) ...................... 09 56324

(51) Int. Cl.
*H01G 9/00* (2006.01)
*H01G 9/08* (2006.01)

(52) U.S. Cl.
CPC ................. *H01G 9/08* (2013.01); *H01G 9/155* (2013.01); *Y02E 60/13* (2013.01); *Y02T 10/7022* (2013.01)
USPC .......................................... 361/502; 361/503

(58) Field of Classification Search
CPC ................................. H01G 9/08; H01G 11/78
USPC ...................................................... 361/502, 503
See application file for complete search history.

(56) References Cited

U.S. PATENT DOCUMENTS

| | | | | |
|---|---|---|---|---|
| 1,583,648 A | * | 5/1926 | Benner | 429/86 |
| 3,622,398 A | * | 11/1971 | Sekido et al. | 429/57 |
| 4,222,745 A | | 9/1980 | Cloyd | |
| 4,338,383 A | * | 7/1982 | Jutte et al. | 429/88 |
| 4,545,712 A | * | 10/1985 | Wallace | 411/258 |
| 5,399,445 A | | 3/1995 | Tinker | |
| 6,106,969 A | * | 8/2000 | Lian et al. | 429/90 |
| 6,901,946 B2 | * | 6/2005 | Frazier | 137/312 |
| 2003/0182696 A1 | * | 9/2003 | Ramirez Serrano | 800/319 |
| 2007/0184337 A1 | | 8/2007 | Nagayama et al. | |

FOREIGN PATENT DOCUMENTS

| | | |
|---|---|---|
| DE | 26 23 618 | 11/1977 |
| DE | 101 28 672 | 12/2002 |
| DE | 10 2007 042085 | 3/2009 |
| DE | 10 2008 025422 | 12/2009 |
| GB | 1069685 * | 5/1967 |
| GB | 2 405 743 | 3/2005 |
| WO | WO 2007/107137 | 9/2007 |

* cited by examiner

*Primary Examiner* — Eric Thomas
(74) *Attorney, Agent, or Firm* — Berenato & White, LLC

(57) ABSTRACT

A power storage module for a hybrid system. The module includes internal absorption elements for absorbing electrolytes, and gasses thereof, that may have separated from a storage cell within the module owing to overvoltages. The module may further include external indicator(s) for indicating that such separated electrolytes are contained within the module case. It is possible to protect a user of the power storage module who wants to open the case of this module, in the event that the power storage cell has released electrolyte in gaseous and/or liquid form into the interior of the case.

13 Claims, 1 Drawing Sheet

POWER STORAGE MODULE FOR MICRO-HYBRID SYSTEM OF MOTOR VEHICLE

CROSS-REFERENCE TO RELATED APPLICATIONS AND CLAIM TO PRIORITY

This application relates to International Application No. PCT/FR2010/051861 filed Sep. 7, 2010 and French Patent Application No. 09/56324 filed Sep. 15, 2009, of which the disclosures are incorporated herein by reference and to which priority is claimed.

FIELD OF THE INVENTION

The invention relates to a power storage module, in particular for a system, for example a micro-hybrid system, of a motor vehicle.

BACKGROUND OF THE INVENTION

Vehicles are known which comprise a rotary electrical machine connected electrically to a power storage module.

This power storage module can comprise at least one power storage cell formed by a super capacitor, or as a variant by a battery, for example a lead, lithium or nickel battery.

These power storage cells are contained in a case of the power storage module.

When these power storage cells are operational, they may be subjected to constraints of use which are detrimental to them.

For example when they are charged electrically, in particular by the electrical machine, or by another power storage module of the vehicle, these cells may be subjected to excess voltages.

The excess voltages generate an increase in temperature, which may for example reach a value of over 100° C. Thus, some of the electrolyte of the cell, the boiling point of which is approximately around 80° C. for acetonitrile, becomes gaseous.

The power storage cells can be opened by internal excess pressure by means of excess pressure valves which are placed on the cells, and thus expel gas, consisting for example of at least one out of acetonitrile and hydrogen saturated with acetonitrile.

When it comes into contact with the case, gas condenses and is transformed into liquid acetonitrile which is found in the case.

The disadvantage of the known power storage modules is thus that when the ease of the module is opened, there are risks of finding a mixture of gaseous and liquid electrolyte in the interior of this case, outside the power storage cells.

Thus, a user who wishes to open the case of the module may be in contact with gaseous and/or liquid electrolyte, and therefore be subjected to risks of burns by this electrolyte.

There is a need to eliminate the above-described disadvantages.

SUMMARY OF THE INVENTION

The object of the invention is to propose a new power storage module, in particular for a motor vehicle.

According to the invention, the power storage module comprises:
 a case;
 at least one power storage cell which is contained in the case, and comprises an electrolyte; and
 an electrolyte absorption device, this device being placed in the case and designed to absorb electrolyte in gaseous and/or liquid form which may be expelled by the cell.

By means of the invention, it is possible to protect a user of the power storage module who wants to open the case of this module, in the event that the power storage cell has released electrolyte in gaseous and/or liquid form into the interior of the case.

For example, the user may want to open the storage module in order to replace a power storage cell within the context of an operation of maintenance of this module.

At least some of the gaseous electrolyte which is expelled by the cell may conic into contact with at least one wall of the case, and be transformed by condensation into liquid electrolyte.

According to one embodiment of the invention, the absorption device can be placed at least partially on a portion of the case where liquid electrolyte is liable to be found.

For example, the absorption device ma be placed at least partially on a base of the case.

Thus, the gaseous electrolyte which is expelled by the cell then transformed by condensation into liquid electrolyte can be absorbed by the device, in particular at the base of the case.

According to another embodiment of the invention, the absorption device can be placed at least partially on a portion of the case where gaseous electrolyte is liable to be found when the cell is opened.

For example, the absorption device can be laced at least partially in the vicinity of an opening in the case.

Consequently, when the case is opened, the device can be placed on the passage of the gaseous electrolyte which escapes from the case, and it can therefore absorb this gas.

According to one embodiment of the invention, the absorption device can be formed by a desiccant.

For example, the desiccant can comprise silica gel, a molecular filter, clay of the Montmorillonite type, or active alumina. These desiccants are very porous solid materials, the diameter of the pores of which can be very small. In fact, the developed surface of the pores can be several hundred square meters per gram of desiccant. Thus, water molecules can penetrate into these pores and be fixed. on preferential sites in the interior of these pores, and reference is then made to absorption, since the molecules are fixed on the surface of the solid body of desiccant.

The desiccants can be applied to all gases and/or liquids, provided that there is a material which permits the absorption.

According to one embodiment of the invention, the power storage module can comprise at least one electrolyte indicator unit which is designed to warn of the presence of gaseous and/or liquid electrolyte in the case, outside the cell.

Thus, before opening the case of the power storage module, the user can be warned about the presence of electrolyte in gaseous and/or liquid form in the interior of the case, outside the cells, and can therefore take precautions before handling this module.

If required, the absorption device and the indicator unit can be combined, so as to warn about the absorption of gaseous and/or liquid electrolyte by the absorption device.

Preferably, the indicator unit can be placed in the case, so as to be visible from the exterior of this case, without needing to open this case.

The indicator unit can be formed by a chemical substance which reacts to the electrolyte of the cell.

If required, the chemical substance at least partially change colour when it is in contact with the electrolyte.

For example, this chemical substance can assume the form of a lozenge.

If applicable, the lozenge can either change colour completely, or it can partially change colour on its surface, so as to show for example a form which is representative of a warning sign.

According to one embodiment of the invention, the absorption device and/or the electrolyte indicator unit can be placed on an excess pressure valve of the power storage cell.

In this case, each cell can comprise an absorption device and/or an indicator unit.

According to another embodiment of the invention, the module can comprise at least one electrolyte absorption device which is common to a plurality of power storage cells in the case.

BRIEF DESCRIPTION OF THE DRAWING

The invention will be able to be better understood by reading the following detailed description of non-limiting embodiments of the invention, and by examining the attached drawing, in which.

DETAILED DESCRIPTION

Figure 1:
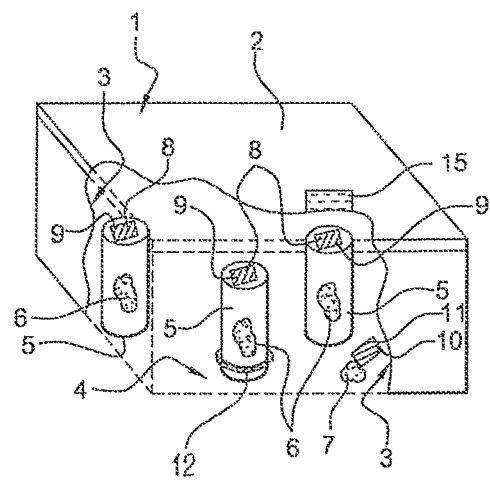
FIG. 1 represents schematically and partially a power storage module according to an embodiment of the invention.

FIG. 1 shows a power storage module 1 for a vehicle, comprising a case 2 which contains a plurality of power storage cells, each formed by a super-capacitor 5.

Each super-capacitor comprises an electrolyte 6. such as acetonitrile or propylene carbonate.

Each super-capacitor additionally comprises an excess pressure valve 8 to expel electrolyte 6 from the super-capacitor 5 when excessive pressure is present within the super-capacitor 5.

This excess pressure is representative of an excessively high temperature of the super-capacitor 5, which for example is higher than a temperature value of approximately 100° C.

This high temperature value can be generated for example because of excess voltage at the terminals of the super-capacitor 5.

The electrolyte 6, the boiling temperature of Which is close to a value of approximately 80° C., becomes gaseous, and some of the electrolyte 6 is expelled from the super-capacitor 5 by means of the excess pressure valve 8.

This gas can consist of acetonitrile and/or hydrogen saturated by acetonitrile.

On its excess pressure valve 8, each super-capacitor 5 comprises an indicator lozenge 9 comprising a chemical substance which reacts to the electrolyte 6 of the super-capacitor 5.

If applicable, the lozenge 9 can either change colour completely, or it can partially change colour on its surface, such as, for example, to show a form which is representative of a warning sign.

This lozenge 9 is placed on the passage of the gaseous electrolyte which is expelled by the super-capacitor 5 such as to absorb some of the gaseous electrolyte, and thus change colour.

In addition, this lozenge 9 is placed such as to be visible from the exterior of the case 2 without opening the case, in order to indicate the presence of electrolyte 6 in the case 2, outside the super-capacitor 5.

For this purpose the case 2 comprises transparent portions 15 which make it possible to see the lozenge 9 from the exterior of the case 2.

Thus, a user who wishes to open the case 2 of the power storage module 1 is warned of the presence of electrolyte 6 in the interior of the case 2, outside the cells 5, and can take precautions before handling this module 1.

In addition, gaseous electrolyte which is expelled by the super-capacitor 5 comes into contact with at least one inner wall 3 of the case 2, and is transformed by condensation into liquid electrolyte 7.

The module 1 comprises an absorption device formed by a desiccant 10 which is packed in a sachet 11 and placed on a base 4 of the case 2 where liquid electrolyte 7 is liable to be found, after having flowed along the wall 3.

For example, the desiccant 10 can comprise silica gel, a molecular filter, clay of the Montmorillonite type, or active alumina. These desiccants are very porous solid materials, the diameter of the pores of which can be very small. In fact, the developed surface of the pores can be several hundred square meters per gram of desiccant. Thus, water molecules can penetrate into these pores and be fixed on preferential sites in the interior of these pores, and reference is then made to absorption, since the molecules arc fixed on the surface of the solid, body of desiccant.

Thus, the gaseous electrolyte which is expelled by the cell 5 then transformed by condensation into liquid electrolyte 7 can be absorbed by the desiccant 10.

In the example described, a single sachet 11 of desiccant 10 is placed in the interior of the case, but as a variant it is possible to place a plurality of associated sachets of desiccant, each for example in the vicinity of a power storage cell.

It will be appreciated that, according to the arrangement of the case in the vehicle, the sachet of desiccant can be placed somewhere other than at the base of the case, and preferably where liquid electrolyte is liable to be found in the case.

For example, when the case of the module is fitted in an inclined manner in the vehicle, the desiccant can be placed on a portion of this case which is situated at the lowest level of the case.

As a variant, the desiccant can be arranged around the power storage cell 5, in particular by forming a ring 12, as illustrated in FIG. 1.

Also as a variant, the desiccant can be placed on an inner wall of the case, and in particular along the entire inner wall of the case.

Figure 2:
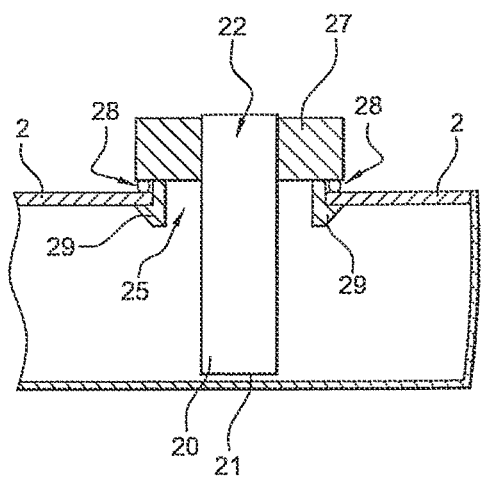
FIG. 2 represents schematically and partially a power storage module according to another embodiment of the invention.

FIG. 2 illustrates a variant embodiment of the absorption device and the indicator lozenge in FIG. 1.

In the example described, the absorption device is in the form of a carton 20 of desiccant in solid form.

This carton 20 is in the form of a solid cylinder comprising a lower part 21 which is placed in the vicinity of the base 4 of the case 2, and an upper part 22 opposite the lower part 21, and is arranged in an opening 25 in the case 2 in order to be visible from the exterior of this ease 2.

The upper part 22 of the solid cylinder is inserted in a support 27 which is secured in the opening 25 in the case 2.

This support 27 comprises resiliently deformable lugs 29 which are snapped into the opening 25 in the case 2.

This support 27 is also secured in a sealed manner to the case 2 by means of an o-ring seal 28 placed between the support 27 and the case 2.

This carton 20 of desiccant is provided, at least on its upper part 22 which is visible from the exterior of the case 2, with a chemical substance which reacts, by changing colour, with the electrolyte 6 of the super-capacitor 5.

Thus, the carton 20 makes it possible firstly to absorb electrolyte 6 which is expelled by the super-capacitor 5, and secondly to warn a user of the module of the presence of electrolyte 6 in the interior of the case 2.

The invention claimed is:

1. A power storage module (1) comprising:
    a case (2);
    at least one power storage cell (5) disposed in the case (2), and comprising an electrolyte (6);
    at least one electrolyte absorption device; and
    at least one electrolyte indicator unit (9) for indicating the presence of electrolyte in the case (2), and outside the cell (5);
    the absorption device disposed in the case to absorb the electrolyte expelled from the at least one cell (5), the absorption device absorbing the electrolyte in both gaseous and liquid form;
    the absorption device formed by a solid desiccant spaced from a base (4) of the case (2).

2. The module (1) according to claim 1, wherein the absorption device (20) and the indicator unit (22) are combined to indicate the absorption of electrolyte by the absorption device.

3. The module (1) according to claim 1, wherein the indicator unit (9) is placed in the case (2), so as to be visible from the exterior of the case (2), without needing to open the case (2).

4. The module (1) according to claim 1, wherein the indicator unit is formed by a chemical substance which reacts to the electrolyte (6) of the cell (5).

5. The module (1) according to claim 4, wherein the chemical substance at least partially changes colour when it is in contact with the electrolyte (6).

6. The module (1) according to claim 1, wherein the case (2) comprises transparent portions (15) so that the indicator unit (9) is visible from the exterior of the case (2) through the transparent portions (15) of the case (2).

7. A power storage module (1), comprising:
    a case (2);
    at least one power storage cell (5) disposed in the case (2), and comprising an electrolyte (6); and
    at least one electrolyte absorption device;
    the absorption device disposed in the case to absorb the electrolyte expelled from the at least one cell (5), the absorption device absorbing the electrolyte in both gaseous and liquid form;
    the absorption device formed by a solid desiccant spaced from a base (4) of the case (2);
    the absorption device (20) being in the form of a carton (20) of the solid desiccant extending into the case through an opening (25) in the case (2).

8. The module (1) according to claim 7, wherein the carton (20) of the desiccant is mounted to a support (27), which is secured to the case adjacent to the opening (25) in the case (2).

9. The module (1) according to claim 8, wherein the support (27) comprises resiliently deformable lugs (29) snapped into the opening (25) in the case (2).

10. The module (1) according to claim 7, wherein an upper part of the carton (20) of the desiccant is visible from the exterior of the case (2).

11. The module (1) according to claim 10, wherein the carton (20) of the desiccant includes a chemical substance which reacts with the electrolyte (6) to indicate the absorption of the electrolyte by the carton (20) of the desiccant.

12. The module (1) according to claim 11, wherein the chemical substance at least partially changes colour when in contact with the electrolyte (6) so that the change of colour of the carton (20) of the desiccant is visible from the exterior of the case (2).

13. A power storage module (1), comprising:
    a case (2);
    at least one power storage cell (5) disposed in the case (2), and comprising an electrolyte (6); and
    at least one electrolyte absorption device;
    the absorption device disposed in the case to absorb the electrolyte expelled from the at least one cell (5), the absorption device absorbing the electrolyte in both gaseous and liquid form;
    the absorption device formed by a solid desiccant spaced from a base (4) of the case (2);
    the absorption device (20) being in the form of a ring (12) of the desiccant arranged around the power storage cell (5);
    the ring (12) of the desiccant including a chemical substance reacting with the electrolyte (6) to indicate the absorption of the electrolyte by the ring (12) of the desiccant;
    the case (2) comprising transparent portions (15) so that the ring (12) of the desiccant being visible from the exterior of the case (2) through the transparent portions (15) of the case (2).

* * * * *